US012801943B2

(12) United States Patent
Qi et al.

(10) Patent No.: US 12,801,943 B2
(45) Date of Patent: Nov. 17, 2026

(54) MACHINE LEARNING MODEL FOR PREDICTING LIKELIHOODS OF EVENTS ON MULTIPLE DIFFERENT SURFACES OF AN ONLINE SYSTEM

(71) Applicant: Maplebear Inc., San Francisco, CA (US)

(72) Inventors: Peng Qi, Menlo Park, CA (US); Cheng Jia, San Jose, CA (US); Xiyu Wang, Union City, CA (US); Qiao Jiang, Malden, MA (US); Sharad Gupta, Jersey City, NJ (US); David Pal, New York, NY (US); Joseph Haraldson, Sunnyvale, CA (US); Zhenbang Chen, Jersey City, NJ (US)

(73) Assignee: Maplebear Inc., San Francisco, CA (US)

( * ) Notice: Subject to any disclaimer, the term of this patent is extended or adjusted under 35 U.S.C. 154(b) by 712 days.

(21) Appl. No.: 18/217,356

(22) Filed: Jun. 30, 2023

(65) Prior Publication Data

US 2025/0005381 A1 Jan. 2, 2025

(51) Int. Cl.

| | |
|---|---|
| ***G06N 3/09*** | (2023.01) |
| ***G06N 3/08*** | (2023.01) |
| ***G06N 5/022*** | (2023.01) |

(52) U.S. Cl.

CPC ............... *G06N 5/022* (2013.01); *G06N 3/08* (2013.01); *G06N 3/09* (2023.01)

(58) Field of Classification Search

CPC ............. G06N 5/022; G06N 3/09; G06N 3/08

See application file for complete search history.

(56) References Cited

U.S. PATENT DOCUMENTS

| | | | | |
|---|---|---|---|---|
| 9,805,102 | B1 * | 10/2017 | Collins | G06F 16/951 |
| 12,494,077 | B1 * | 12/2025 | Tang | G06F 40/284 |
| 2011/0246286 | A1 * | 10/2011 | Cetin | G06Q 30/0243 707/723 |
| 2022/0114483 | A1 * | 4/2022 | Sabharwal | G06N 20/00 |
| 2022/0327134 | A1 * | 10/2022 | Tsoy | G06F 16/24578 |
| 2023/0044574 | A1 * | 2/2023 | Harper | G06F 18/211 |
| 2023/0245777 | A1 * | 8/2023 | Foschini | G16H 50/30 705/2 |
| 2025/0005346 | A1 * | 1/2025 | Lo | H04L 67/535 |

* cited by examiner

*Primary Examiner* — Beau D Spratt

(74) *Attorney, Agent, or Firm* — Fenwick & West LLP

(57) ABSTRACT

An online system manages presentation of content items in various presentation contexts such as when the users are browsing pages or when the users have entered a search query. The online system trains a single unified machine learning model that predicts one or more likelihoods of a target event associated with presentation of a content item in the different presentation contexts. The learned model is applied to a set of candidate content items associated with a presentation opportunity in a specific context. Features that are inapplicable to the specific context may be masked when applying the model. The online system may select between the candidate content items based on the predicted likelihoods using the model trained across the multiple different contexts, such that the prediction for one context may be based in part on learned outcomes in other related contexts.

18 Claims, 5 Drawing Sheets

MACHINE LEARNING MODEL FOR PREDICTING LIKELIHOODS OF EVENTS ON MULTIPLE DIFFERENT SURFACES OF AN ONLINE SYSTEM

BACKGROUND

Online systems often provide different surfaces that enable users to find and interact with various types of items, such as media items to view or products to purchase. For example, a user may access a search interface of an online system to find an item of interest. Alternatively, a user may browse pages of content offered by the online system to search for or discover an item of interest. Online systems thus offer different contexts in which content is presented to users.

The content provided by online systems is often ranked using trained models, which are trained using observed users' activity, where the content may be presented in different contexts. For example, the content items on a page of content browsed by a user may be ranked, in part, by a score from a trained model that predicts the likelihood that a user will click on each content item. Similarly, the search results from a search interface on an online system may be ranked, in part, by a likelihood that a user would click on each search result. Although the likelihood of a user engaging with an object in one context versus another context is expected to be similar, the different contexts can lead to different outcomes. As such, online systems typically train different models to predict events in the different contexts.

But training and then maintaining multiple machine learning models for predicting events in different presentation contexts is computationally inefficient. Moreover, this prevents a prediction of an event in one context from benefiting from observations about the event's occurrence in another context, since the backpropagation that trains the model for one event does not help the other model to learn from another event, which may be highly correlated. This in turn also fails to take full advantage of information gained when the online system performs exploration to obtain training data for underrepresented items or users in one context, especially when such exploration is difficult or impossible to perform in the other context.

SUMMARY

To address these problems, an online system trains a single unified machine learning model to predict a likelihood of an event in multiple different presentation contexts of the online system. In one or more embodiments, the online system obtains training data based on its users' interactions with the online system. The training data includes multiple training examples, where each training example comprises information about a user's interaction with the online system in one of the presentation contexts (e.g., search or browsing) and a label indicating whether the event being predicted (e.g., selecting a particular item, like a search result) actually occurred. By training a single model with training data from the multiple different presentation contexts, information learned from one presentation context is used to improve the prediction of the likelihood of the event in another presentation context.

In one or more embodiments, the machine learning model is trained to map context-dependent sets of training features to the event. For example, a first context-dependent set of training features associated with a first presentation context has at least one training feature in common with a second context-dependent set of training features associated with a second presentation context. Additionally, the first context-dependent set of training features has at least one training feature that is inapplicable to the second context-dependent set of training features. The context-dependent sets of training features may be derived from historically observed data associated with presenting content to users of the online system in at least the first presentation context and the second presentation context. The context-dependent training features may include user data, item data, and features associated with the presentation context.

Once the model is trained, in one or more embodiments, the online system obtains a set of input features relating to a particular viewing user who is interacting with the online system in a first presentation context. The online system applies the machine learning model to this set of input features to infer the likelihood that the event will occur in this presentation context. The online system then ranks content to be presented to the user in this first presentation context based at least in part on the predicted likelihood and generates a user interface presenting content to the user based on this ranking. For example, in the presentation context of a search interface, the online system may predict a likelihood that a user will click on each of a set of possible search results and then arrange the search results in a user interface for the user based on these predictions.

In one or more embodiments, obtaining the machine learning model comprises identifying a superset of training features representing a union of the context-dependent sets of training features, and executing a machine learning algorithm to train the machine learning model based on the superset in which training features of the superset that are inapplicable to a training dataset are masked with respect to the training dataset. In one or more embodiments, obtaining the set of input features comprises masking a subset of the input features relating to data that is inapplicable to the presentation context.

DETAILED DESCRIPTION

Figure 1:
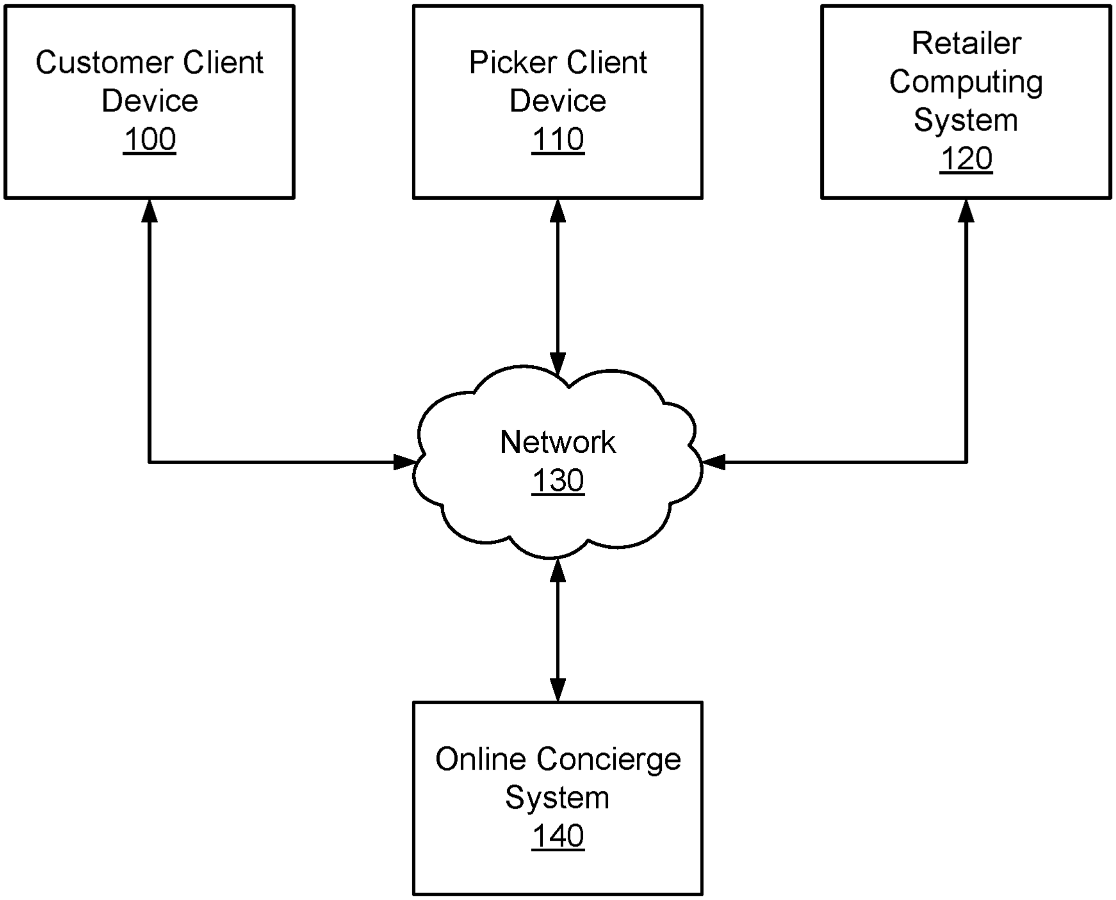
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a message (which may include text, images, or a combination thereof) to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
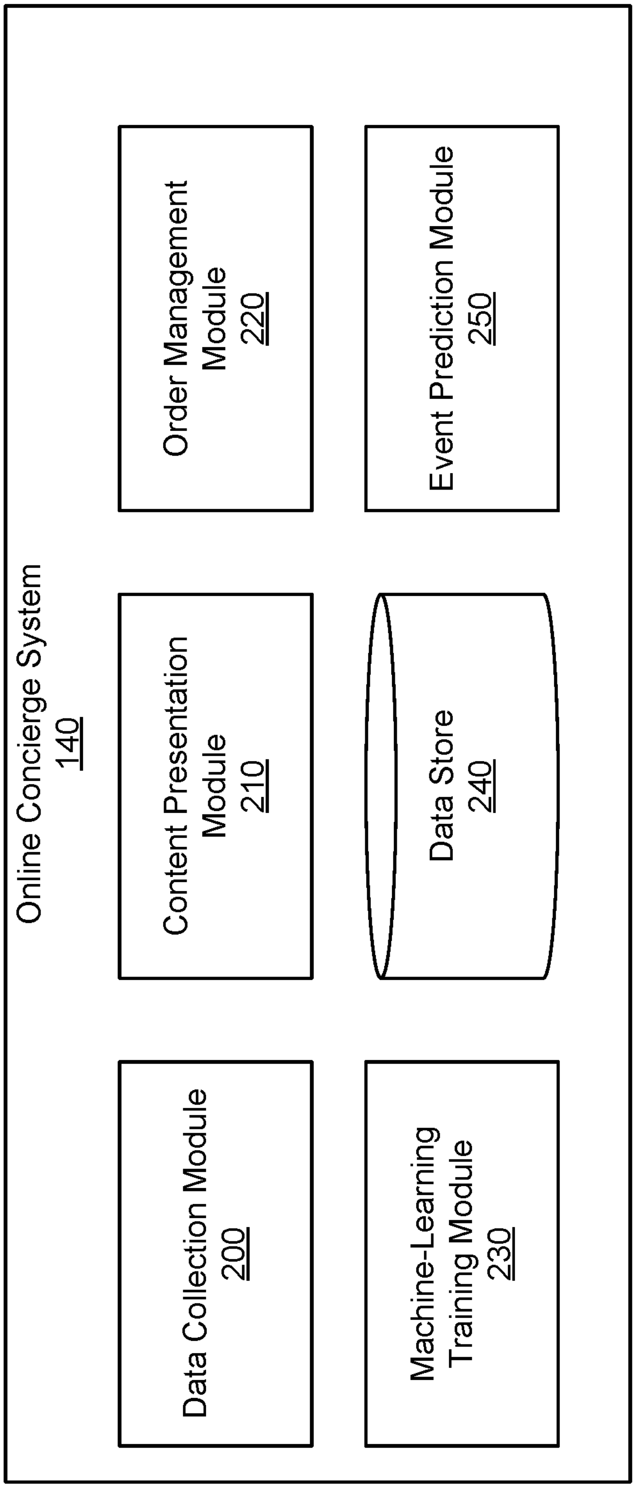
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, a data store 240, and an event prediction module 250. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describes characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by the same or separate machine learning models and may be stored in the data store 240. The item scoring may furthermore be based on predicted likelihoods of events (e.g., selecting an item to add an order) obtained from the event prediction module 250, discussed below.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140.

The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, factorization machines, sequence-to-sequence models, generative adversarial networks, or transformers.

In one or more embodiments, the machine learning training module 230 repeatedly retrains a machine learning model by using the model to acquire new training examples. The new training examples are obtained by applying the model in the actual environment and then observing the results. The model can then be retrained using the new training examples, thereby continually improving the computer system to perform the task for which the model was originally trained.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data and may use databases to organize the stored data.

The event prediction module 250 predicts likelihoods of events in response to presented content items. For example, the event prediction module 250 may predict a likelihood of a user selecting a particular item for viewing or adding to an order. The predictions may be utilized by the content presentation module 210, described above, to make decisions about which content items (e.g., from a set of candidate items) to present in a user interface. For example, in the context of a search query, the event prediction module 250 may predict likelihoods of a user selecting different candidate items, and the content presentation module 210 may then rank and present search results in a user interface based at least in part on these likelihoods. Furthermore, in the context of browsing activity, the event prediction module 250 may predict likelihoods of a user selecting candidate items, and then content presentation module 210 may organize the candidate items in the browsing user interface based on the likelihoods.

The event prediction module 250 may employ a single unified machine learning model that can make such predictions for multiple different presentation contexts such as a search interface presented in response to a search query, a browsing page presented in response to browsing activity, or with respect to other presentation surfaces available in the online concierge system 140. The machine learning model may be trained on unified training data relating to user activities across the multiple different contexts. The multi-context machine learning model beneficially enables inferences relevant to a particular context that may be influenced by learned relationships from other contexts, thereby providing improved predictive performance relative to systems that employ a set of independent models for different contexts.

Figure 3:
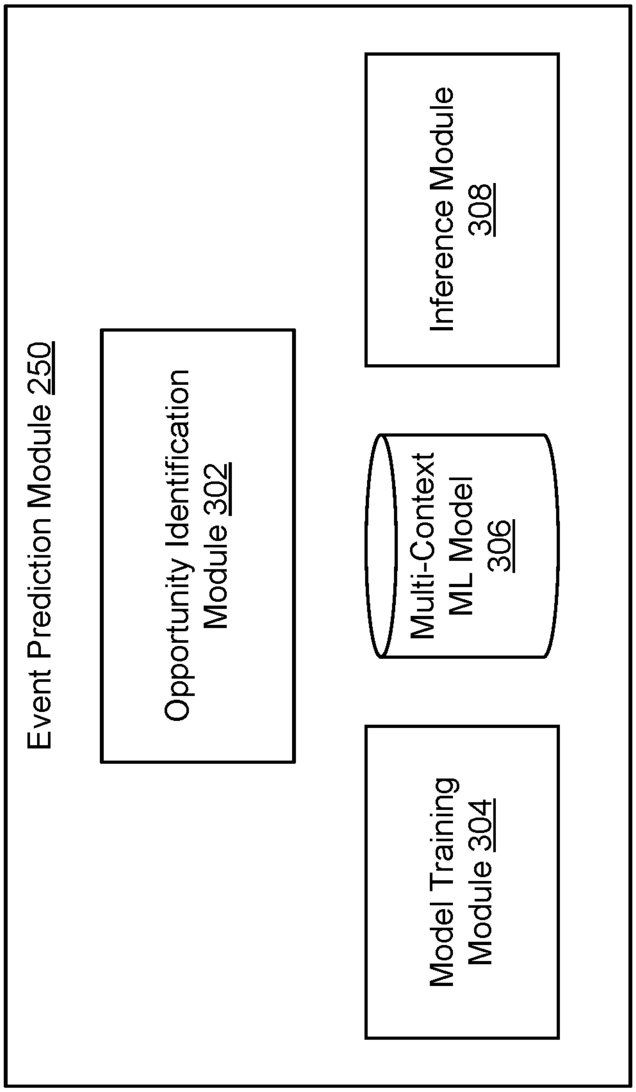
FIG. 3 is a block diagram illustrating an event prediction module, in accordance with one or more embodiments.

FIG. 3 is a block diagram illustrating one or more embodiments of an event prediction module 250. The event prediction module 250 includes opportunity identification module 302, a model training module 304, a multi-context machine learning model 306, and an inference module 308. In alternative embodiments, the event prediction module 250 includes additional or different modules.

The opportunity identification module 302 identifies opportunities for displaying different content items in the online concierge system 140. Presentation opportunities may arise in various contexts such as, for example, when a customer performs a search, when a customer browses for items in an item database, when a customer is reviewing items added to a shopping cart for an order, or other contexts. In one or more embodiments, there may be multiple different search contexts and/or multiple different browse contexts that affect how the online concierge system 140 selects content items for presentation, which may be dependent on various factors relating to the user, the manner of presenting the ad, or other factors. Furthermore, content items may be displayed in a promotional space in a user interface of the customer client device 100, which may be separate from the search or browse results and not necessarily directly related to a search or browse request. For example, a recommended content item may be presented on the side of the search or browse results or in another predefined screen location on other interface screens associated with the customer client device 100. In further embodiments, the candidate content items may be identified for delivering externally to the customer client device 100. For example, recommended or promotional content items may be delivered via push notification, via text message, via email, or via other electronic communication mechanisms.

In an embodiment, a content presentation opportunity is associated with a specific impression time that specifies when the content item will be presented. Content presentation opportunities may furthermore include various parameters that constrain the types of content items that can be selected for presentation. For example, content items presented in response to search queries or browse selections may be limited to items reasonably relevant to the search query or browsing categories.

The model training module 304 trains a multi-context machine learning (ML) model 306 applied by the inference module 308 to predict likelihoods of events associated with presentation of one or more candidate content items available for a presentation opportunity. The model training module 304 trains the multi-context machine learning model 306 based on training data associated with multiple different presentation contexts for presenting content items in the online concierge system 140. For example, the model training module 304 may utilize training data associated with search activities in a search user interface, browsing interactions in a browsing page, and/or other contexts associated with content presentation opportunities. The training data may include, for example, user data representing user characteristics (e.g., anonymized user identifier, user profile data, demographic data, preferences, geographic data, historical orders, historical browsing activity, historical search activity, historical content item interactions, etc.), item data representing item characteristics (e.g., item identity, item category, historical presentations of the items, historical purchases, historical search activity relating to the item, etc.), event occurrences observed responsive to the presentations (e.g., whether the user selected the content item), and/or various scoring data representing performance indicators such as conversion rates, click through rates, sales volume, profitability, or other metrics attributable to content item presentations, and/or predictions from various upstream deep learning or machine learning models related to user preference, product relevance or repurchase propensity, or any other data associated with the online concierge system 140 described herein. The user data, item data, or other data may be represented as respective embeddings, comprising pre-processed input vectors representing the underlying data. The training data may be organized into sets of training features (represented, for example, as a training feature vector), where each set of training features is derived from data associated with presentation of a historical content item in a particular context. The training data may be filtered, transformed, and/aggregated in various ways to generate the set of training features. For example, a set of training features derived from a historical content item presentation may include the context in which the content item was presented (e.g., in a search interface or a browse interface), information about the customers to which the content item was presented, information about the item itself, occurrences of events responsive to presentation of the content items, and performance indicators such as click through rate, conversion rate, etc. associated with the content item presentation. The training feature vectors may furthermore be labeled to indicate whether an event to be predicted (e.g., a user selecting a content item) occurred in response to the presentation of the content items.

The set of applicable input features associated with presentation of a content item may be dependent on the presentation context. Some features may be applicable to multiple different contexts and at least some features may be inapplicable to certain contexts. For example, a feature describing a search term is applicable to the search presentation contexts but may be inapplicable to browse presentation contexts. Similarly, a browsing category applicable to browse presentation contexts may be inapplicable to search presentation contexts. In other examples, different features may be applicable depending on factors such as the access mode (mobile application or website), geographic area, or other factors that may result in different types of features being available in different contexts.

The model training module 304 applies a training algorithm to the training features associated with example (e.g., historical) presentations of content items from the multiple different contexts in order to develop a multi-context machine learning model 306. In one embodiment, each training vector may have the same structure and may include elements for values associated with the union of training features across all contexts. Elements that are inapplicable in a specific feature vector may be masked by setting the value to zero, a null value, or another predefined masking value. For example, a feature vector representing training data associated with a historical presentation of a content item in a browse presentation context may include a masking value for a feature element intended to represent a search term. In another embodiment, feature vectors associated with different contexts may have different structures. Here, different elements of the feature vectors may have different meanings dependent on the context. The context may be indicated in the feature vector itself. In this way, the model 306 can learn the relevance of different feature vector elements in different contexts.

The model training module 304 may train the multi-context machine learning model 306 by applying a machine learning algorithm using any of the techniques described herein (e.g., with respect to the machine learning training module 230). Because the machine learning model 306 is trained on data derived from multiple different presentation contexts with varying input feature sets, the model 306 beneficially learns relationships that can be applied across different contexts. For example, the machine learning model 306 may learn the impact of input features on the likelihood of a particular event occurring in response to presentation of content items in a search presentation context in a manner that can be applied to predict likelihoods of the event when the content items are instead presented in a browse presentation context. These interactions enable the multi-context machine learning model 306 to achieve improved predictive performance relative to techniques that train and apply independent machine learning models for different contexts.

The inference module 308 applies the multi-context machine learning model 306 to a set of input features associated with a candidate content item to predict a likelihood of an event associated with presentation of the candidate content item. As described above, the input features may be different depending on the context of the presentation opportunity. In an embodiment, the inference module 308 may mask elements of an input feature vector that are inapplicable to the context. Alternatively, the inference module 308 may apply the machine learning model 306 to input vectors with different structures that may vary dependent on the context as described above. The inference module 308 may output one or more likelihoods of an event occurring responsive to presentation of the content item in the relevant context. The likelihoods may be combined to generate various predicted performance metrics for a candidate content item such as, for example, predicted click through rate, prediction conversion rate, predicted profitability, etc.

As described above, the content presentation module 210 may rank the candidate content items based on likelihoods and select the top scoring candidate content items for presentation. In other embodiments, the content presentation module 210 may select the candidate content items based in part on the likelihoods and based in part on various other data. For example, in the context of recommended or promotional content items, the content presentation module 210 may conduct an automated online auction that obtains bids associated with presenting different content items and selects one or more winning bids based on the bid amount and the likelihoods or a performance metric derived from the likelihoods.

Figure 4:
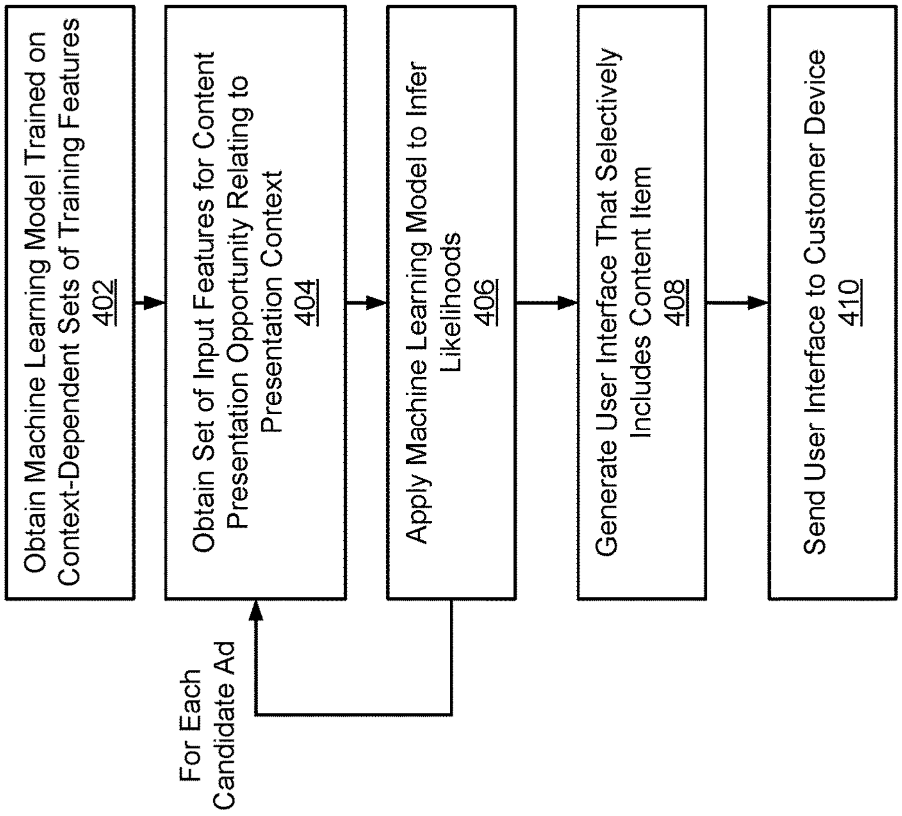
FIG. 4 is a flowchart illustrating an example process for performing content item selection using a multi-context machine learning model, in accordance with one or more embodiments.

FIG. 4 is a flowchart for a method for managing ads in an online concierge system 140, in accordance with some embodiments. Alternative embodiments may include more, fewer, or different steps from those illustrated in FIG. 4, and the steps may be performed in a different order from that illustrated in FIG. 4. These steps may be performed by an online concierge system (e.g., online concierge system 140). Additionally, each of these steps may be performed automatically by the online concierge system without human intervention.

The event prediction module 250 accesses 402 a machine learning model trained based on context-dependent sets of training features to predict a likelihood of a target event given a display of a content item in a presentation context. The context-dependent sets of training features may be derived from historically observed data associated with presenting historical content items in the online concierge system 140 and may include, for example, user data, item data, event occurrences responsive to the display, and/or scoring data associated with historical responses to the content items. The historical data may relate to content items presented in multiple different presentation contexts including, for example, one or more search presentation contexts and one or more browse presentation contexts. The different contexts may result in different features available for training the model in which some features may overlap, and some features may be context dependent. In this situation, the context-dependent set of training features associated with a first context (such as a search presentation context) may have at least one training feature in common with a second context-dependent set of training features associated with a second context (such as a browse presentation context), and the first context-dependent set of training features associated with the first context may have at least one training feature that is inapplicable to the second set of training features associated with the second context, and/or vice versa. For example, a feature describing a search term may be applicable to the search presentation contexts but may be inapplicable to browse presentation contexts. Similarly, browse presentation contexts may result in features inapplicable to search presentation context such as, for example, browsing categories or browsing depth. In some embodiments, the different contexts may include two or more search presentation contexts and/or two or more browse presentation contexts that result in different context-dependent features. For example, different contexts may result from whether the search or browse feature was accessed via a website or a mobile application, based on varying functionality in different geographical regions, or other factors.

In some embodiments, the search interface presentation context and the browsing page presentation context may also contain subcontexts. For example, for browse collections and browse item details, collections may have a "collection title" as a context (e.g., tropical fruits, dairy, etc.), and a browse item details page may contain a source item as a context. In this example, all the recommendations on the page are related or complementary products to a specific item.

The machine learning model is trained to map the context-dependent sets of training features to an occurrence of a target event. The machine learning model is trained on multiple different contexts with varying input features, and beneficially learns relationships that can be applied across different contexts. For example, the machine learning model may learn the impact of input features on performance of search presentation contexts in a manner that can be applied to predict performance of browse presentation contexts, and vice versa.

The event prediction module 250 obtains 404 a set of input features for the content presentation opportunity associated with a presentation context. For example, the content presentation opportunity may arise in the context of a user search (as a search results) or in the context of browsing activity (as a browsing results). The set of input features may be dependent on the context as described above. Input features that are inapplicable to the input context may be masked when applying the machine learning model to the input features. For example, the input features may be represented as a feature vector in which each entry represents a value associated with a corresponding feature.

The event prediction module 250 applies 406 the machine learning model to predict a likelihood of the target event given display of a candidate content item to the viewing user in the presentation context. The target event may comprise, for example, a user selecting the candidate content item. Alternatively, the target event may comprise achieving a target performance metric such a predicted click-through rate or other metric for assessing relevance of content items. The event prediction module 250 may similarly obtain 404 input features associated with other candidate content items and apply 406 the machine learning model to each of the candidate ads to generate respective likelihoods of the target event.

The content presentation module 210 may then generate 408 a user interface in the presentation context that selectively includes the candidate content item based on the predicted likelihood. For example, the content presentation module 210 may rank the candidate content items based on their likelihoods and generate 408 the user interface based on the predicted likelihoods. For example, the content presentation module 210 may rank the candidate content items directly by likelihoods and select the top ranked candidate content items. In other embodiments, different selection criteria may be applied. For example, the ranking and selection may be based on a combination of an input score, bid amount, or other parameters in combination with the likelihood. The content presentation module 210 then sends 410 the user interface to a device of the viewing user to cause the device to display the user interface, which results in presentation of the selected content item in the customer client device 100.

Figure 5:
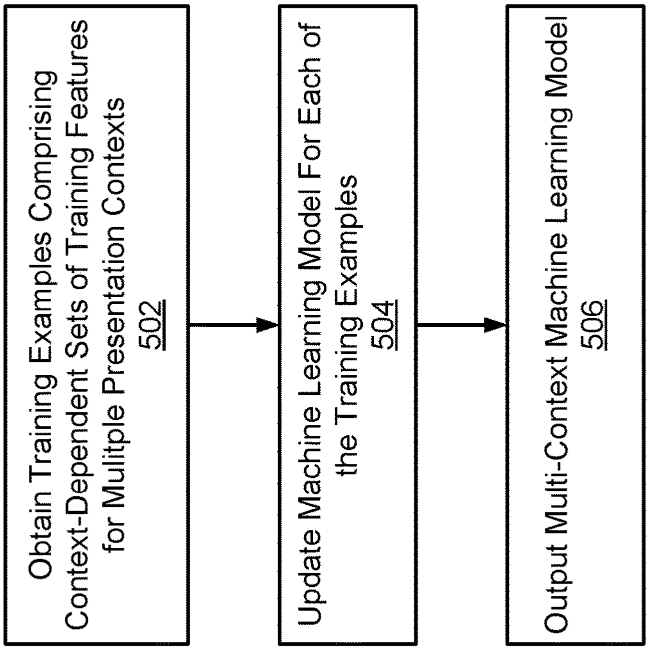
FIG. 5 is a flowchart illustrating an example process for training a unified multi-context machine learning model that predicts likelihoods of event occurrences in association with candidate content items presentable in multiple different presentation contexts of an online system.

FIG. 5 is a flowchart for a method training a unified machine learning model to predict likelihoods of a target event based on training data sets spanning multiple contexts and having different sets of relevant input features. Alternative embodiments may include more, fewer, or different steps from those illustrated in FIG. 5, and the steps may be performed in a different order from that illustrated in FIG. 5. These steps may be performed by an online concierge system (e.g., online concierge system 140). Additionally, each of these steps may be performed automatically by the online concierge system without human intervention.

The event prediction module 250 obtains 502 training examples comprising context-dependent sets of training features for training the machine learning model. The training features may be derived from training data relating to previous display of a content item and a label indicating whether the target event occurred during historical operations of the online concierge system 140. For example, the training data may relate to user characteristics (e.g., anonymized user identifier, user profile data, demographic data, preferences, geographic data, historical orders, historical browsing activity, historical search activity, historical content interactions, etc.) and/or item data (e.g., item identity, item category, historical ads for the items, historical purchases, historical search activity relating to the item, etc.). The training data may furthermore comprise various scores or other metrics associated with content presentation, including predictions from other deep learning/machine learning models. For example, the data may indicate which ads were selected, which ads resulted in conversions, and other associated metrics such as dollars spent, profitability, sales volume, or other metrics that can be attributed to content presentation. Various features may be derived from the training data. For example, the training data may be filtered, transformed, and/or aggregated in various ways to generate a set of training features, which may be represented as a training vector. As described, the machine learning model may be trained on a superset of training features representing the union of the context-dependent sets of training features derived from the training data from different contexts. A particular training feature vector derived from training data for a particular context may mask entries associated with features that are inapplicable to that context. For example, a training feature vector derived from a historical browse presentation context may mask a value associated with an input search term because the term is unavailable in the data in this context. Masking may be accomplished by setting the entry associated with the inapplicable feature to zero, a null value, or another predefined masking value. The masking technique enables training feature vectors with the same structure to be for feature vectors derived from different contexts that may have some overlapping features and some features that are inapplicable.

The event prediction module 250 updates 504 a machine learning model for each of the training examples based on an error between a prediction by the model of whether the target event occurred and a label indicating whether the target event occurred. Here, the event prediction module 250 may apply a machine learning algorithm to the context-dependent sets of training features to train the multi-context machine learning model. Any of the techniques described above may be utilized for this purpose. The event prediction module 250 then outputs 506 the machine learning model for application in the inference stage described in FIG. 4.

In various embodiments, the training algorithm of FIG. 5 may be employed in an offline training process and/or may be periodically updated as additional data is collected. Updating the model in this manner enables its predictive performance to improve over time.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:

accessing a machine learning model trained to predict a likelihood of a target event given a display of a content item by an online system to a user in a presentation context of a plurality of different presentation contexts, wherein the machine learning model is trained by:

obtaining a plurality of training examples, wherein each training example comprises a context-dependent set of training features associated with a previous display of a content item and a label indicating whether the target event occurred, wherein the context-dependent set of training features associated with a first presentation context has at least one training feature in common with the context-dependent set of training features associated with a second presentation context, and wherein the context-dependent set of training features associated with the first presentation context has at least one training feature that is inapplicable to the context-dependent set of training features associated with the second presentation context, and wherein the obtained plurality of training examples comprises training examples associated with the first presentation context having a first context-dependent set of training features and training examples associated with the second presentation context having a second context-dependent set of training features different from the first context-dependent set of training features, and updating the machine learning model, for each of the training examples, based on an error between a prediction by the machine learning model of whether the target event occurred and a label indicating whether the target event occurred, wherein updating the machine learning model comprises:

identifying a superset of training features representing a union of the context-dependent sets of training features, and training the machine learning model based on the superset in which training features of the superset that are inapplicable to a training dataset are masked with respect to the training dataset by setting values associated with the inapplicable training features to a predefined masking value;

obtaining a set of input features associated with an opportunity to present content by the online system to a viewing user in a presentation context of the opportunity;

applying the machine learning model to the obtained set of input features to predict a likelihood of the target event given a display of a candidate content item by the online system to the viewing user in the presentation context;

generating a user interface in the presentation context that selectively includes the candidate content item based on the predicted likelihood; and sending the user interface to a device of the viewing user, the sending causing the device of the viewing user to display the user interface.

2. The method of claim 1, wherein the first presentation context comprises a search interface, and the second presentation context comprises a browsing page.

3. The method of claim 1, wherein the first presentation context and the second presentation context generate different input features.

4. The method of claim 1, wherein obtaining the plurality of training examples features comprises deriving the context dependent sets of training features from historically observed data associated with presenting content in at least the first presentation context and the second presentation context.

5. The method of claim 1, wherein obtaining the plurality of training examples features comprises deriving the context-dependent sets of training features are from one or more of: user data, item data, event occurrences, and scoring metrics associated with historical orders of the online system.

6. The method of claim 1, wherein obtaining the set of input features comprises masking a subset of the input features relating to data that is inapplicable to the presentation context.

7. The method of claim 1, wherein the target event comprises a selection of the candidate content item.

8. A non-transitory computer-readable storage medium storing instructions executable by one or more processors for performing steps including:

accessing a machine learning model trained to predict a likelihood of a target event given a display of a content item by an online system to a user in a presentation context of a plurality of different presentation contexts, wherein the machine learning model is trained by:

obtaining a plurality of training examples, wherein each training example comprises a context-dependent set of training features associated with a previous display of a content item and a label indicating whether the target event occurred, wherein the context-dependent set of training features associated with a first presentation context has at least one training feature in common with the context-dependent set of training features associated with a second presentation context, and wherein the context-dependent set of training features associated with the first presentation context has at least one training feature that is inapplicable to the context-dependent set of training features associated with the second presentation context, and wherein the obtained plurality of training examples comprises training examples associated with the first presentation context having a first context-dependent set of training features and training examples associated with the second presentation context having a second context-dependent set of training features different from the first context-dependent set of training features, and updating the machine learning model, for each of the training examples, based on an error between a prediction by the machine learning model of whether the target event occurred and a label indicating whether the target event occurred, wherein updating the machine learning model comprises:

identifying a superset of training features representing a union of the context-dependent sets of training features, and training the machine learning model based on the superset in which training features of the superset that are inapplicable to a training dataset are masked with respect to the training dataset by setting values associated with the inapplicable training features to a predefined masking value;

obtaining a set of input features associated with an opportunity to present content by the online system to a viewing user in a presentation context of the opportunity;

applying the machine learning model to the obtained set of input features to predict a likelihood of the target event given a display of a candidate content item by the online system to the viewing user in the presentation context;

generating a user interface in the presentation context that selectively includes the candidate content item based on the predicted likelihood; and sending the user interface to a device of the viewing user, the sending causing the device of the viewing user to display the user interface.

9. The non-transitory computer-readable storage medium of claim 8, wherein the first presentation context comprises a search interface, and the second presentation context comprises a browsing page.

10. The non-transitory computer-readable storage medium of claim 8, wherein the first presentation context and the second presentation context generate different input features.

11. The non-transitory computer-readable storage medium of claim 8, wherein obtaining the plurality of training examples features comprises deriving the context dependent sets of training features from historically observed data associated with presenting content in at least the first presentation context and the second presentation context.

12. The non-transitory computer-readable storage medium of claim 8, wherein obtaining the plurality of training examples features comprises deriving the context-dependent sets of training features are from one or more of: user data, item data, event occurrences, and scoring metrics associated with historical orders of the online system.

13. The non-transitory computer-readable storage medium of claim 8, wherein obtaining the set of input features comprises masking a subset of the input features relating to data that is inapplicable to the presentation context.

14. The non-transitory computer-readable storage medium of claim 8, wherein the target event comprises a selection of the candidate content item.

15. A system, comprising:

one or more processors; and a non-transitory computer-readable storage medium storing instructions executable by one or more processors for performing steps including:

accessing a machine learning model trained to predict a likelihood of a target event given a display of a content item by an online system to a user in a presentation context of a plurality of different presentation contexts, wherein the machine learning model is trained by:

obtaining a plurality of training examples, wherein each training example comprises a context-dependent set of training features associated with a previous display of a content item and a label indicating whether the target event occurred, wherein the context-dependent set of training features associated with a first presentation context has at least one training feature in common with the context-dependent set of training features associated with a second presentation context, and wherein the context-dependent set of training features associated with the first presentation context has at least one training feature that is inapplicable to the context-dependent set of training features associated with the second presentation context, and wherein the obtained plurality of training examples comprises training examples associated with the first presentation context having a first context-dependent set of training features and training examples associated with the second presentation context having a second context-dependent set of training features different from the first context-dependent set of training features, and updating the machine learning model, for each of the training examples, based on an error between a prediction by the machine learning model of whether the target event occurred and a label indicating whether the target event occurred, wherein updating the machine learning model comprises:

identifying a superset of training features representing a union of the context-dependent sets of training features, and training the machine learning model based on the superset in which training features of the superset that are inapplicable to a training dataset are masked with respect to the training dataset by setting values associated with the inapplicable training features to a predefined masking value;

obtaining a set of input features associated with an opportunity to present content by the online system to a viewing user in a presentation context of the opportunity;

applying the machine learning model to the obtained set of input features to predict a likelihood of the target event given a display of a candidate content item by the online system to the viewing user in the presentation context;

generating a user interface in the presentation context that selectively includes the candidate content item based on the predicted likelihood; and sending the user interface to a device of the viewing user, the sending causing the device of the viewing user to display the user interface.

16. The system of claim 15, wherein the first presentation context comprises a search interface, and the second presentation context comprises a browsing page.

17. The system of claim 15, wherein the first presentation context and the second presentation context generate different input features.

18. The system of claim 15, wherein obtaining the plurality of training examples features comprises deriving the context dependent sets of training features from historically observed data associated with presenting content in at least the first presentation context and the second presentation context.

* * * * *